United States Patent [19]
Somasundaran et al.

[11] Patent Number: 6,051,143
[45] Date of Patent: Apr. 18, 2000

[54] SOLID-LIQUID SEPARATION USING PHASE TRANSITIONAL N-SUBSTITUTED PYRROLIDONES

[75] Inventors: Ponisseril Somasundaran, Nyack, N.Y.; Maltesh Chidambaram, Naperville, Ill.; Brian A. Pethica, Upper Montclair, N.J.; Xiang Yu, Paramus, N.J.; Anjing Lou, New York, N.Y.

[73] Assignee: The Trustees of Columbia University in the City of New York

[21] Appl. No.: 08/970,405

[22] Filed: Nov. 14, 1997

[51] Int. Cl.⁷ ............................. B01D 21/01; B03B 1/00
[52] U.S. Cl. ............................. 210/729; 210/737; 209/5; 516/162
[58] Field of Search ................... 210/725, 727, 210/729, 737; 516/162; 501/148; 209/5

[56] References Cited

U.S. PATENT DOCUMENTS

| | | | |
|---|---|---|---|
| 2,952,620 | 9/1960 | Wade | 208/162 |
| 3,272,689 | 9/1966 | Lenz | 166/283 |
| 4,707,298 | 11/1987 | Tymon | 516/102 |
| 4,956,121 | 9/1990 | Tymon et al. | 106/483 |
| 5,093,031 | 3/1992 | Login et al. | 516/203 |
| 5,294,644 | 3/1994 | Login et al. | 514/698 |
| 5,330,546 | 7/1994 | Ramesh et al. | 210/734 |
| 5,407,480 | 4/1995 | Payton et al. | 106/487 |

FOREIGN PATENT DOCUMENTS

| | | |
|---|---|---|
| 0 186 982 A2 | 7/1986 | European Pat. Off. . |
| 2002064 | 10/1993 | U.S.S.R. . |

OTHER PUBLICATIONS

Flocculation/Dispersion of Suspensions by Controlling Adsorption and Conformation of Polymers and Surfactants, P. Somasundaran and Xiang Yu in *Advances in Colloid and Interface Science*, 53 1994, Month Unknown pp. 33–49.

Adsorption Phenomena at the Surface of Silica Spheres in a Binary Liquid Mixture, D. Beysens and D. Esteve, in *Physical Review Letters*, May 13, 1985, pp. 2123–2126, vol. 54, No. 19.

Wetting on Cylinders and Spheres, M. Gelfand and R. Lipowsky, *Physical Review B*, Dec. 1, 1987, pp. 8725–8735, vol. 36, No. 16.

Specialty Pyrrolidones: Is this the solution you are looking for?, BASF Corporation, Date unknown.

Critical Wetting, Flocculation of Silica Particles in Near–Critical Lutidine–Water Mixtures and Related Phenomena, Ernest A. Boucher, *J. Chem. Soc. Faraday Trans.*, 1990, Month unknown, pp. 2263–2267.

English Abstract of Savinchuk, Russian Patent No. 2,002,064, Derwent Abstract AN–94–073064, Class A41, week 9409, (WPI).

English Language Translation of Russian Patent 2002064, dated Oct. 30, 1993 Applicants disclosed the Russian language version and corresponding English language abstract on Mar. 4, 1998.

*Primary Examiner*—Richard D. Lovering
*Assistant Examiner*—Daniel S. Metzmaier
*Attorney, Agent, or Firm*—Baker & Botts L.L.P.

[57] ABSTRACT

A process is disclosed for flocculating particles in a liquid suspension by mixing the suspension with a pyrrolidone having alkyl, alkenyl, aryl, alkylaryl, and arylalkyl radicals from 1 to 18 carbon atoms to form a mixture at a temperature above a minimum flocculation temperature for the mixture.

30 Claims, No Drawings

SOLID-LIQUID SEPARATION USING PHASE TRANSITIONAL N-SUBSTITUTED PYRROLIDONES

BACKGROUND OF THE INVENTION

The present invention relates generally to a process for the use of pyrrolidones for concentrating fine colloidal particles from liquid suspensions containing colloidal particles.

Control and modification of interfacial properties of colloidal particles in liquid media have long been the subject of a great deal of attention. Controlling the stability and wettability of colloidal dispersions is often the key factor that determines the efficiency of various industrial processes such as effluent treatment and mineral and ceramic processing, and the quality of products such as cosmetics, pharmaceuticals, and foods, as described by P. Somasundaran and Xiang Yu in *Advances in Colloid and Interface Science*, volume 53, pages 31–49 (1994).

Colloidal particles in liquid dispersion media exhibit Brownian motion resulting in frequent collisions. Stability and other dispersion characteristics are affected by the nature of the interactions between the particles during such collisions. When attractive forces dominate, the particles will aggregate and the dispersion may destabilize. When repulsive forces dominate, the system will remain in a dispersed state.

Flocculation occurs by concentrating finely divided particles which are suspended in a liquid. Generally, flocculation occurs through the utilization of an inorganic coagulant or organic flocculant that brings the particles together, as described in U.S. Pat. No. 5,330,546, issued to Ramesh et al. Inorganic flocculants, such as alum and iron salts, may be used, however water soluble organic polymers are more commonly used to flocculate particles. Naturally occurring and synthetic polymers are also used as flocculants, especially in the mining industry. The principal natural polymer flocculants, such as starch and guar, are high-molecular weight polysaccharides consisting of a mixture of linear and branched segments.

Synthetic polymers have the advantage that they can be tailored to specific applications, resulting in a wide range of commercially available flocculants of varying charge, composition, and molecular weight. The most widely used synthetic coagulants include polydiallydimethylammonium chloride (poly-DADMAC or DADMAC) and condensation polymers of epichlorohydrin and dimethylamine (Epi/DMA). These structures vary greatly in molecular weight.

Colloidal silica particles have been found to flocculate in a solution of water and 2,6-lutidine at close to the phase transition or demixing temperature, as described in D. Beysen and D. Esteve, 54 *Physics Review Letters* 2123 (1985). The flocculation was found to be reversible. Upon lowering the temperature below the lower critical solution temperature, the particles were re-dispersible. This flocculation phenomenon was thought to be caused by capillary condensation, i.e., the coexistence curve being displaced between two particles as a result of wetting, as described in M. P. Gelfand and R. Lipowsky, B36 *Physics Review* 8725 (1987). Polyvinylpyrrolidones have been used to flocculate kaolinite and montmorillonite, as described by A. M. Gad, M. A. Khattab, W. Kotb and F. F. Assaad, 34 *Alexandria Engineering Journal* D119 (1995) and S. Smimabayashi, M. Okuda, and M. Nakagaki, 36 *Chemical and Pharmaceutical Bulletin* 1257 (1988).

N-alkyl pyrrolidones have found wide commercial acceptance as non-toxic, aprotic chemical solvents. Similar to other members of the lactam family, pyrrolidones are resonance stabilized by the lactam oxygen and adjacent ring nitrogen. Among many of their advantageous characteristics are solubility in both polar and non-polar solvents and an ability to participate in hydrogen bonding. The properties of pyrrolidones have attracted increasing industrial interest for a wide variety of applications, such as solvents in cleaning printing presses, coating strippers in the electronics industry and formulating agents for many crop protection products, as described in a *Technical Brochure, Specialty Pyrrolidones*, BASF Corporation, Mount Olive, N.J. 07828. For example, U.S. Pat. Nos. 5,093,031 and 5,294,644, incorporated herein by reference, describe surface active properties of N-alkyl pyrrolidones, such as solubility, wetting, viscosity building, emulsifying and/or complexing. However, the use of N-alkyl pyrrolidones for the concentration of colloidal particles is heretofore unknown.

Known flocculants generally suffer from low settling rates, high sediment volume, and a difficulty in reclaiming the flocculant after sedimentation. In addition, many available flocculants are not biodegradable and emit noxious odors. Other disadvantages of a number of available flocculants include high vapor pressure and toxicity.

SUMMARY OF THE INVENTION

Accordingly, it is an object of the invention to provide enhanced flocculation and/or separation of hydrophobic and hydrophilic fine particles suspended in a liquid media with low settlement volumes.

Another object of the invention is to concentrate fine colloidal particles from a liquid suspension using a flocculant which is biodegradable, odor free, has low vapor pressure and low toxicity and is partially or completely miscible with water.

A further object of the invention is to concentrate fine colloidal particles from a liquid suspension using a nonpolymeric flocculant which is more effective for solid-liquid separation, provides higher settling rates and lower sediment volume and offers more options for reagent recovery than polymeric flocculants.

These and other objects of the invention are obtained by flocculating colloidal particles in a liquid suspension by mixing the suspension with a pyrrolidone defined by the formula:

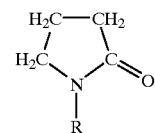

where R is a hydrocarbon radical selected from alkyl, alkenyl, aryl, alkylaryl, and arylalkyl radicals having from 1 to 18 total carbon atoms. As used herein, the term "mixing" includes everything from mere contacting to complete homogenization. The mixture temperature should be above a minimum flocculation temperature for the pyrrolidone and the suspension. In contrast to the use of polymeric flocculants of the prior art, the process of the instant invention uses non-polymeric pyrrolidones as the flocculating agents resulting in substantially more effective flocculation, bigger floc size, higher settling rates, and lower settlement volumes.

N-substituted pyrrolidones also have many additional advantages which shall become apparent upon detailed consideration of the invention with reference to the accompanying drawings.

DETAILED DESCRIPTION

As used herein, the minimum flocculation temperature is defined as the lower temperature at which two liquid phases form in the suspension and pyrrolidone. This minimum flocculation temperature can be approximated by the lower consolute temperature, which is the lowest temperature at which two phases form in the pyrrolidone and the suspending liquid. Preferably, the pyrrolidone concentration exceeds its single phase solubility limit in the mixture.

The liquid may be either aqueous or non-aqueous; preferably it is water. The colloidal particles may be either hydrophilic or hydrophobic. Preferred hydrophobic colloidal particles are graphite or coal; preferred hydrophilic particles are kaolinite. Other appropriate particles include zeolites, bentonite, montmorillonite, and other clays; substances containing copper sulfide particles, for example chalcopyrite ore, zinc sulfide particles, for example sphalerite ore, iron sulfide particles, lead sulfide particles, for example galena ore, and nickel sulfide particles; and paint particles, including pigments. Preferably, the concentration of the colloidal particles is from 0.1 to 25 weight percent of the suspension. The optimum concentration of pyrrolidone in the mixture depends on the pyrrolidone, the liquid, the temperature, and the type and concentration of colloidal particles; but preferably the concentration of the pyrrolidone is from 0.1 to 20 weight percent of the mixture. Preferably the value of R is from 4 to 12 carbon atoms, most preferably from 6 to 12 carbon atoms.

The flocs may be separated after allowing the them to settle, with or without assistance. The particles may be separated from the flocs by lowering the temperature below the phase transition temperature to reverse flocculation and to provide a suspension from which the particles may be separated by centrifugation. Recovery of the pyrrolidone after separating the particles can be accomplished by raising the temperature to induce phase separation. The pyrrolidone can then be skimmed from the surface.

The following specific examples are intended to illustrate certain aspects of the present invention; they are not to be construed as limitations thereof.

Alkyl substituted pyrrolidones can be made using the methods described in U.S. Pat. Nos. 5,093,031 and 5,294,644, issued to Login et al., incorporated herein by reference, but in the following examples the alkyl substituted pyrrolidones were obtained from International Specialty Products, Inc. Synthetic graphite powder having a purity greater than ninety-eight percent and an average diameter of 1 $\mu$m was obtained from Aldrich Chemical Company. Pittsburgh No. 8 coal of 200 mesh was used in the examples described herein. Well-crystallized Georgia Kaolinite was obtained from the clay depository at the University of Missouri. The Kaolinite described herein had an estimated specific surface area of 9.4 $m^2/g$ as characterized by nitrogen adsorption.

Flocculation was determined using the following procedure: 0.5 gram of solid and a desired amount of water were added into a 15 ml graduated cylinder and the suspension was subjected to ultrasonication for 5 minutes in a Fisher Scientific FS-9 ultrasonic bath for mixing purposes. Following 15 minutes of shaking, a calculated amount of pyrrolidone was added into the suspension to produce a known concentration of pyrrolidone in solution, and the flocculation was then evaluated. The settling rate in centimeters per minute (cm/min) was determined by measuring the descent of the upper interface between the floc and the liquid. The volume of sediment after a given time of settling was also recorded.

Phase diagrams of the N-substituted pyrrolidone and the water solutions were obtained in the following manner: 10 ml of pyrrolidone-water mixture of known concentration in a glass vial was placed into a Brinkman Lauda RM 6 water bath and phase separation was visually observed. Temperature was controlled at an accuracy of ±0.1° C.

Table 1 list data for a phase diagram of cyclohexyl(a), hexyl(b), octyl(c) pyrrolidones mixed with water.

TABLE 1

Data for Phase Diagram of Alkyl Pyrrolidones

| HP conc., volume % | Temp., °C | CHP conc., volume % | Temp., °C | OP conc., volume % | Temp., °C |
|---|---|---|---|---|---|
| 1.1 | 43 | 8 | 80 | 0.01 | 30 |
| 2 | 24 | 9 | 60 | 0.05 | 10 |
| 4.5 | 20 | 13 | 50 | 0.1 | 0 |
| 8.1 | 19 | 20 | 43 | | |
| 12 | 19 | 30 | 40 | | |
| 18 | 19 | 40 | 43 | | |
| 24 | 19 | 60 | 59 | | |
| 31 | 20 | 65 | 75 | | |
| 38 | 22 | | | | |
| 44 | 24 | | | | |
| 52 | 30 | | | | |
| 63 | 41 | | | | |

At laboratory temperatures, cyclohexyl pyrrolidone ("CHP") is fully miscible. Cyclohexyl pyrrolidone and hexyl pyrrolidone ("HP") show two-phase co-existence with lower consolute temperatures (hereinafter "LCT") of 40 and 19° C. respectively. The shape of the co-existence curves for cyclohexyl pyrrolidone and hexyl pyrrolidone are rather flat-bottomed. The complete phase diagram of octyl pyrrolidone ("OP") and water were not determined because the LCT of octyl pyrrolidone apparently falls below the freezing point of that solution. It can be seen from the phase diagrams of pyrrolidones that at a given temperature, the concentration range for the coexistence of two separate phases decreases with an increase in alkyl chain length. The shape of the co-existence curves and LCT can be shifted upon the addition of electrolytes, acids, and alkalis. For example, addition of 1 Molal of NaCl increases the lower consolute temperature of hexyl-pyrrolidone by ten degrees centigrade (10° C.), whereas the lower consolute temperature decreases by thirteen degrees (13° C.) centigrade with the addition of 1 Molal of HCl.

EXAMPLE 1

Hexyl Pyrrolidone and Water

Table 2 shows the stability of graphite particles in water, in terms of settling rate, as a function of hexyl pyrrolidone concentration.

TABLE 2

Settling Rates of Graphite at Varying Concentrations of Hexyl Pyrrolidone

| Concentration, volume % | Settling rate, cm/min |
|---|---|
| 0 | 0 |
| 2 | 2 |
| 3 | 3 |
| 5 | 2 |
| 10 | 7 |

TABLE 2-continued

Settling Rates of Graphite at Varying Concentrations of Hexyl Pyrrolidone

| Concentration, volume % | Settling rate, cm/min |
|---|---|
| 15 | 160 |
| 20 | 160 |
| 25 | 7.5 |
| 50 | 1 |
| 100 | 0 |

The pH of the suspension of graphite in water, in the absence of pyrrolidone, was approximately 6, at which the graphite particles are relatively stable because the particles have a strong electrostatic repulsion due to their negative charge. The addition of hexyl pyrrolidone to the graphite suspension caused flocculation of graphite particles. As shown in Table 2, the settling rate of particles increases sharply at 5 volume percent hexyl pyrrolidone concentration, reaching a maximum at 10 volume percent hexyl pyrrolidone concentration, followed by a decrease in flocculation as the concentration of hexyl pyrrolidone increases. The optimum flocculation condition was observed at a concentration around 10 volume percent, at which time all particles formed a single floc on the bottom of the cylinder. The floc was redispersed by intense shaking, but the graphite particles readily aggregated back to a single floc once the external agitation was stopped.

EXAMPLE 2

Cyclohexyl Pyrrolidone and Water

The effect of cyclohexyl pyrrolidone on the flocculation of graphite was determined using the same procedures as in Example 1. Graphite suspensions were found to be stable at all concentrations of cyclohexyl pyrrolidone at room temperature.

EXAMPLE 3

Octyl Pyrrolidone and Water

Table 3 shows the flocculation of a graphite-water suspension by the addition of octyl pyrrolidone.

TABLE 3

Settling Rates of Graphite at Varying Concentrations of Octyl Pyrrolidone

| Concentration, volume % | Settling rate, cm/min |
|---|---|
| 0 | 0 |
| 1 | 5 |
| 2 | 7.5 |
| 3 | 160 |
| 5 | 160 |
| 7.5 | 160 |
| 10 | 6.5 |
| 40 | 0 |
| 60 | 0 |
| 100 | 0 |

As can be seen from Table 3 for concentrations of octyl pyrrolidone above 2 volume percent, the flocculation increased sharply. The 2 volume percent corresponds to the phase separation of the octyl pyrrolidone in the presence of the solid. A single floc was formed at concentration ranges from 2.5 to 8 volume percent. The volume of the sediment at this concentration range was less than 1.5 ml, indicating that the solid concentration in the sediment is more than 35 volume percent.

EXAMPLE 4

Flocculation Rate of Graphite Particles as a Function of Alkyl Chain Length

The effect of a series of alkyl pyrrolidones at constant concentrations, except for n-dodecyl pyrrolidone and octyl pyrrolidone, whose maximum solubility in water is less than one percent, on flocculation was determined in accordance with the procedures in Example 1. Table 4 shows flocculation of graphite suspensions obtained with pyrrolidones of various alkyl chain length at fixed concentrations, 2 and 5 volume percent.

TABLE 4

Settling Rates of Graphite at Varying Pyrrolidone Alkyl Chain Lengths

| Akyl Chain Length | Settling Rate, cm/min, at 2 volume % | Settling Rate, cm/min, at 5 volume % |
|---|---|---|
| 2 | 0.4 | 0.3 |
| 3 | 0.6 | 0.7 |
| 4 | 1.0 | 2.0 |
| 6 | 0.8 | 82.0 |
| 8 | 8.0 | 90.0 |
| 12 | 9.0 | 160.0 |

Flocculation rates or settling rates are dependent on the carbon chain length of the alkyl group (R) at a given concentration. Thus, longer alkyl chain lengths can be used to reduce the amounts of pyrrolidone flocculant.

EXAMPLE 5

Flocculation of Coal with Hexyl Pyrrolidone and Octyl Pyrrolidone

The effect of hexyl and octyl pyrrolidones on coal flocculation was determined in accordance with the procedures in Example 1. Table 5 shows settling rates of coal particles from an aqueous suspension of coal using hexyl and octyl pyrrolidones. Instantaneous flocculation, wherein all particles formed a single floc, was obtained with octyl pyrrolidone in the concentration range from 2 to 4 volume percent. The settling rate of particles increased sharply at 5 volume percent in the case of hexyl pyrrolidone. These results suggest that coal particles, which are hydrophobic like graphite, flocculate in a similar manner as the graphite particles in Example 2.

TABLE 5

Settling Rates of Coal at Varying Concentrations of Hexyl and Octyl Pyrrolidone

| Hexyl Pyrrolidone | | Octyl Pyrrolidone | |
|---|---|---|---|
| Concentration, volume % | Settling rate, cm/min | Concentration, volume % | Settling rate, cm/min |
| 2 | 2 | 0.2 | 4.5 |
| 5 | 108 | 0.2 | 6 |
| | | 0.5 | 10 |

TABLE 5-continued

Settling Rates of Coal at Varying Concentrations of Hexyl and Octyl Pyrrolidone

| Hexyl Pyrrolidone | | Octyl Pyrrolidone | |
|---|---|---|---|
| Concentration, volume % | Settling rate, cm/min | Concentration, volume % | Settling rate, cm/min |
| | | 1.0 | 52 |
| | | 1.0 | 58 |
| | | 2.0 | 160 |
| | | 2.0 | 160 |
| | | 3.0 | 160 |
| | | 5.0 | 100 |
| | | 10.0 | 40 |

EXAMPLE 6

Flocculation of Kaolinite with Hexyl Pyrrolidone

Kaolinite behaves as a hydrophilic particle in a water suspension. Table 6 shows the stability of kaolinite particles in water, expressed in the term of settling rate, as a function of hexyl pyrrolidone concentration.

TABLE 6

Settling Rates of Kaolinite at Varying Concentrations of Hexyl Pyrrolidone

| Concentration, volume % | Settling rate, cm/min |
|---|---|
| 0 | 0.6 |
| 1 | 0.8 |
| 1 | 0.1 |
| 2 | 0.4 |
| 5 | 8.2 |

The addition of hexyl pyrrolidone to the suspension caused flocculation of kaolinite particles but at a much higher concentration and lower settling rate than that of either graphite or coal. A pronounced minimum was observed at 10 volume percent hexyl pyrrolidone for Kaolinite, as opposed to graphite where this concentration of hexyl pyrrolidone was found to be the optimum for flocculation. This may allow for selective separation of the hydrophobic particles from hydrophilic particles by varying the concentrations of the alkyl pyrrolidone.

As indicated from the phase diagrams of pyrrolidones, an increase in the substituted alkyl chain length can either decrease concentration of two phase co-existence or decrease the LCT. Further, as shown in Example 4, alkyl chain length affects the minimum flocculation concentration. The effect of temperature on the stability of graphite water suspensions in the presence of 5 to 50 volume percent cyclohexyl pyrrolidone was determined visually without measuring the settling rate. The results are summarized in Table 7.

TABLE 7

Temperature effect on the stability of graphite water suspensions in the presence of cyclohexyl pyrrolidone (CHP).

| Vol. % CHP→ | 5% | 10% | 20% | 30% | 50% |
|---|---|---|---|---|---|
| 23° C | Dispersed | Dispersed | Dispersed | Dispersed | Dispersed |
| 35° C | Dispersed | Dispersed | Dispersed | Dispersed | Dispersed |
| 45° C | Dispersed | Flocculated | Dispersed | Dispersed | Dispersed |
| 55° C | Dispersed | Flocculated | Flocculated | Flo./Dis. | Dispersed |

Although the graphite suspension was stable throughout the entire concentration range of cyclohexyl pyrrolidone at room temperature, flocculation was observed when the temperature was elevated. A minimum flocculation temperature was estimated to be 40° C., which is approximately the same temperature as the lower consolute temperature for the cyclohexyl pyrrolidone-water solution in Example 1. Thus, flocculation appears to occur only above the temperature where the pyrrolidone-water mixture exhibits two separate phases.

Similar concentration and temperature effects were observed for flocculation with hexyl pyrrolidone. The minimum flocculation temperatures are approximately the same as the lower consolute temperature, where the two phases exist for alkyl pyrrolidone-water solutions. For octyl and other pyrrolidones, the minimum flocculation temperature is the ice point of the mixture, approximately zero degrees centigrade, because the LCT is below the ice point of the mixture. In this regard, the lower consolute temperature and the minimum flocculation temperature for alkyl pyrrolidones appear to be indistinguishable. Further, it has been observed that an increase in temperature usually results in the decrease of the minimum flocculation concentration.

The flocculation of graphite dispersions in the presence of commercially available high molecular weight cationic, acrylamide based polymers: Allied Colloids PERCOL 789 and Cynamin SUPERFLOC N100 is shown in Table 8.

TABLE 8

Settling Rates of Graphite at Varying Concentrations of Commercially Available Polymeric Flocculants

| Allied Colloids Percol 789 | | Cyanamid Superfloc N100 | |
|---|---|---|---|
| Concentration, mg/l | Settling rate, cm/min | Concentration, mg/l | Settling rate, cm/min |
| 0 | 0 | 0 | 0 |
| 10 | 2.5 | 4 | 4.8 |
| 20 | 4.5 | 2 | 5.3 |
| 30 | 6.0 | 5 | 8.5 |
| 60 | 1.7 | 100 | 13.0 |
| 100 | 1.0 | 150 | 7.2 |
| 200 | 0.7 | 200 | 6.6 |
| | | 400 | 5.6 |

Allied Colloids Percal and Cyanamid Superfloc are two flocculants widely used for suspensions of hydrophobic and negatively charged particles. The maximum flocculation, expressed in terms of settling rate, is less than one tenth of that obtained with the pyrrolidones of the present invention. Moreover, the volume of sediment obtained with polymeric flocculants is more than three times higher than that achieved using the pyrrolidones of the present invention, i.e. ~5 ml to 1.5 ml.

Other organic liquids which also exhibit partial phase separation when mixed with water, such as long chain alcohols, for example amyl alcohol and octyl alcohol, were studied to determine whether such flocculation phenomenon is caused by all phase transitional liquids. The results showed that although the long chain alcohols can provide flocculation of graphite suspensions to some extent, the effectiveness is much less significant compared to the flocculation obtained with pyrrolidones, both in terms of settling rate and sediment volume. Surprisingly, there appears to be some unique, unexplained special characteristics of pyrrolidone which cause such excellent flocculation. Although the exact mechanism is unknown, this phenomenon promises to have many applications in fields such as solid-liquid separations and consolidation.

Although the invention has been described herein with respect to specific embodiments, many modifications and variations therein will readily occur to those skilled in the art. Accordingly, all such variations and modifications are included within the intended scope of the invention.

What is claimed is:

1. A process for flocculating particles in a liquid suspension comprising:
    mixing the suspension with at least one pyrrolidone having a formula of:

$$\begin{array}{c} H_2C\text{———}CH_2 \\ | \quad\quad\quad | \\ H_2C \quad\quad C \\ \diagdown N \diagup \quad \diagdown O \\ | \\ R \end{array}$$

where R is a hydrocarbon radical selected from the group consisting of alkyl, alkenyl, aryl, alkylaryl, and arylalkyl radicals, having from 6 to 18 total carbon atoms; thereby forming a mixture whereby aggregation of the particles in the dispersion is induced by the pyrrolidone; and wherein the mixing occurs at a temperature above a minimum flocculation temperature for the mixture.

2. The process according to claim 1, wherein the liquid comprises water.

3. The process according to claim 2, wherein the particles comprise hydrophobic particles.

4. The process according to claim 3, wherein the particles comprise particles selected from the group consisting of graphite particles and coal particles.

5. The process according to claim 2, wherein the particles comprise hydrophilic particles.

6. The process according to claim 5, wherein the particles comprise kaolinite particles.

7. The process according to claim 1, wherein the concentration of particles in the liquid suspension is from 0.1 to 25 weight percent.

8. The process according to claim 1, wherein R is a hydrocarbon radical selected from the group consisting of alkyl, alkenyl, aryl, alkylaryl, and arylalkyl radicals having from 6 to 12 carbon atoms.

9. The process according to claim 1, wherein the pyrrolidone concentration of the mixture is from 0.1 to 20 weight percent.

10. The process according to claim 1, further comprising the step of adding a lower consolute temperature modifier selected from the group consisting of electrolytes, acids, and alkalis.

11. A process for flocculating particles in a liquid suspension comprising:
    mixing the suspension with at least one pyrrolidone having a formula of:

$$\begin{array}{c} H_2C\text{———}CH_2 \\ | \quad\quad\quad | \\ H_2C \quad\quad C \\ \diagdown N \diagup \quad \diagdown O \\ | \\ R \end{array}$$

where R is a hydrocarbon radical selected from the group consisting of alkyl, alkenyl, aryl, alkylaryl, and arylalkyl radicals, having from 6 to 18 carbon atoms; thereby forming a mixture whereby aggregation of the particles in the dispersion is induced by the pyrrolidone, and wherein the pyrrolidone is mixed in an amount exceeding the single phase solubility limit of the pyrrolidone in the liquid.

12. The process according to claim 11, wherein the liquid comprises water.

13. The process according to claim 12, wherein the particles comprise hydrophobic particles.

14. The process according to claim 13, wherein the particles comprise particles selected from the group consisting of graphite particles and coal particles.

15. The process according to claim 12, wherein the particles comprise hydrophilic particles.

16. The process according to claim 15, wherein the particles comprise kaolinite particles.

17. The process according to claim 11, wherein the particles are at a concentration in the mixture of from 0.1 to 25 weight percent.

18. The process according to claim 11, wherein R is a hydrocarbon radical selected from the group consisting of alkyl, alkenyl, aryl, alkylaryl, and arylalkyl radicals having from 6 to 12 carbon atoms.

19. The process according to claim 11, wherein the pyrrolidone is at a concentration in the mixture of from 0.1 to 20 volume percent.

20. The process according to claim 11, further comprising the step of adding a lower consolute temperature modifier selected from the group consisting of electrolytes, acids, and alkalis.

21. A process for flocculating particles in a liquid suspension comprising:
    mixing the suspension with at least one pyrrolidone having a formula of:

$$\begin{array}{c} H_2C\text{———}CH_2 \\ | \quad\quad\quad | \\ H_2C \quad\quad C \\ \diagdown N \diagup \quad \diagdown O \\ | \\ R \end{array}$$

where R is a hydrocarbon radical selected from the group consisting of alkyl, alkenyl, aryl, alkylaryl, and arylalkyl radicals, having from 6 to 18 total carbon atoms; thereby forming a mixture, and
    heating the mixture to above a minimum flocculation temperature for the mixture whereby aggregation of the particles in the dispersion is induced by the pyrrolidone.

22. A process for flocculating particles in a liquid suspension comprising:
    mixing the suspension with at least one pyrrolidone having a formula of:

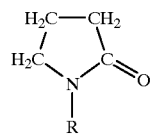

where R is a hydrocarbon radical selected from the group consisting of alkyl, alkenyl, aryl, alkylaryl, and arylalkyl radicals, having from 6 to 18 total carbon atoms; thereby forming a mixture whereby aggregation of the particles in the dispersion is induced by the pyrrolidone, wherein the liquid suspension is at a temperature above the minimum flocculation temperature for the mixture.

23. A process for flocculating particles in a liquid suspension comprising:

mixing the suspension with at least one pyrrolidone having a formula of:

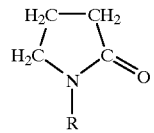

where R is a hydrocarbon radical selected from the group consisting of alkyl, alkenyl, aryl, alkylaryl, and arylalkyl radicals, having from 6 to 18 total carbon atoms; thereby forming a mixture whereby aggregation of the particles in the dispersion is induced by the pyrrolidone, wherein the pyrrolidone is at a temperature above the minimum flocculation temperature for the mixture.

24. A process of separating particles from at least part of a liquid suspension, comprising the process of flocculating according to claims 1, 11, 21, 22, or 23, to form at least one floc, and further comprising the step of separating the floc from the mixture.

25. The process according to claim 24, wherein the floc is allowed to settle by gravity before being separated from the mixture.

26. The process according to claim 24, further comprising a step of lowering the floc temperature below the phase transition temperature to reverse the flocculation and to provide a second suspension.

27. The process according to claim 26, further comprising centrifuging the second suspension.

28. A process of recovering at least some pyrrolidone from a pyrrolidone-particle floc, wherein the pyrrolidone has a formula of:

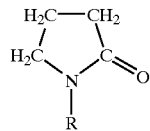

where R is a hydrocarbon radical selected from the group consisting of alkyl, alkenyl, aryl, alkylaryl, and arylalkyl radicals, having from 6 to 18 total carbon atoms, comprising cooling the pyrrolidone-particle floc below a minimum flocculation temperature to form a suspension of particles in a liquid comprising the pyrrolidone; and separating the liquid from the particles to provide a supernatant comprising the pyrrolidone.

29. The process according to claim 28, further comprising steps of:

heating the supernatant above a minimum phase separation temperature, thereby forming a pyrrolidone rich phase; and removing the pyrrolidone rich phase.

30. A process of recovering at least some pyrrolidone from a pyrrolidone-particle floc contained in a liquid mixture, comprising in the order recited, the steps of:

separating the floc from at least part of the liquid; and the steps according to claim 29.

* * * * *

UNITED STATES PATENT AND TRADEMARK OFFICE
CERTIFICATE OF CORRECTION

PATENT NO. : 6,051,143
DATED : April 18, 2000
INVENTOR(S) : Ponisseri Somasundaran, et al It is certified that error appears in the above-identified patent and that said Letters Patent is hereby corrected as shown below:

Column 2, lines 66-67: "with reference to the accompanying drawings" should be deleted;

Column 4, line 7: "list" should read -- lists --;

Column 8, line 39: "Cynamin" should read -- Cyanamid --;

Signed and Sealed this

Seventeenth Day of April, 2001

Attest:

NICHOLAS P. GODICI

*Attesting Officer*   Acting Director of the United States Patent and Trademark Office